(12) United States Patent
Ikeda

(10) Patent No.: US 8,703,343 B2
(45) Date of Patent: Apr. 22, 2014

(54) LITHIUM SECONDARY BATTERY WITH ELECTRODE PROTECTIVE LAYER AND INITIAL CAPACITY RATIO AND MANUFACTURING METHOD THEREOF

(75) Inventor: Hiroaki Ikeda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 359 days.

(21) Appl. No.: 13/121,711

(22) PCT Filed: Sep. 25, 2009

(86) PCT No.: PCT/JP2009/066601
§ 371 (c)(1), (2), (4) Date: Mar. 30, 2011

(87) PCT Pub. No.: WO2010/041556
PCT Pub. Date: Apr. 15, 2010

(65) Prior Publication Data
US 2011/0189546 A1 Aug. 4, 2011

(30) Foreign Application Priority Data
Oct. 10, 2008 (JP) .................................. 2008-264415

(51) Int. Cl.
H01M 2/16 (2006.01)
H01M 4/62 (2006.01)
H01M 4/36 (2006.01)

(52) U.S. Cl.
CPC .............. H01M 4/628 (2013.01); H01M 4/366 (2013.01)
USPC .......................... 429/251; 429/209; 429/218.1

(58) Field of Classification Search
CPC ............................ H01M 4/628; H01M 4/366
USPC ........................ 429/209, 218.1, 251
See application file for complete search history.

(56) References Cited

U.S. PATENT DOCUMENTS

2007/0202365 A1* 8/2007 Sawa et al. ................. 429/9
2008/0081263 A1* 4/2008 Saisho et al. ................ 429/338

FOREIGN PATENT DOCUMENTS

| CN | 101212039 | 7/2008 |
|----|-----------|--------|
| JP | 7-220759 | 8/1995 |
| JP | 9-147916 | 6/1997 |
| JP | 2005-327680 | 11/2005 |
| JP | 2006-310010 | 11/2006 |
| JP | 2008-159333 | 7/2008 |
| JP | 2008159333 A * | 7/2008 |
| JP | 2009-181756 | 8/2009 |

OTHER PUBLICATIONS

International Search Report in International Application No. PCT/JP2009/066601; Mailing Date: Dec. 15, 2009.

* cited by examiner

*Primary Examiner* — Zachary Best
(74) *Attorney, Agent, or Firm* — Finnegan, Henderson, Farabow, Garrett & Dunner, LLP

(57) ABSTRACT

In a lithium secondary battery provided by the present invention, the layer density on a side facing a protective layer (46) in a negative electrode active material layer (44) and/or positive electrode active material layer where the protective layer is formed, the protective layer containing an insulating filler and a binder, is higher than the layer density in a central portion and a side facing a current collector (42) in the negative electrode active material layer and/or positive electrode active material layer where the protective layer is formed.

5 Claims, 4 Drawing Sheets

LITHIUM SECONDARY BATTERY WITH ELECTRODE PROTECTIVE LAYER AND INITIAL CAPACITY RATIO AND MANUFACTURING METHOD THEREOF

TECHNICAL FIELD

The present invention relates to a lithium secondary battery of a configuration in which a protective layer containing an insulating filler and a binder is formed on an electrode active material layer, and a manufacturing method thereof.

Furthermore, the present international application claims priority on Japanese Patent Application No. 2008-264415, filed on Oct. 10, 2008, the contents of which are incorporated herein in their entirety by reference.

BACKGROUND ART

In recent years, secondary batteries such as lithium secondary batteries (and typically, lithium ion batteries) or nickel hydrogen batteries have become increasingly important as power supplies for vehicles using electricity for their driving power source and as power supplies installed in electric products such as personal computers and portable terminals. Lithium secondary batteries in particular are expected to be used as high-output, vehicle-mounted power supplies since they are lightweight and allow the obtaining of high energy density, and their demand is expected to increase.

In a typical configuration of this type of lithium secondary battery, electrodes (positive electrode and negative electrode) are provided that employ a configuration in which electrode active material layers (and more specifically, a positive electrode material layer and a negative electrode active material layer), mainly composed of an electrode active material capable of reversibly occluding and releasing lithium ions, is formed on electrode current conductors. In addition, these electrode active material layers are formed by coating a composition, prepared in the form of a paste or slurry by dispersing an electrode active material in a suitable solvent, onto an electrode current conductor followed by drying and compressing with a roller and the like.

Examples of the prior art relating to this type of electrode of a lithium secondary battery are disclosed in Patent Documents 1 to 3. Patent Document 1 discloses a technology for preventing loss of an electrode active material by providing a porous protective film on the surface of either of a positive electrode active material and negative electrode active material layer. In addition, Patent Document 2 discloses a technology for controlling the pore structure of a porous film by setting an average particle diameter and the like of α-alumina particles of a porous film composed of an inorganic oxide filler (α-alumina particles) and a binder. Moreover, Patent Document 3 discloses a technology for improving durability in a lithium secondary battery having a ceramic layer composed mainly of ceramic particles by preventing loss of a ceramic coating layer by defining the density of a negative electrode active material layer.

Patent Document 1: Japanese Patent Application Laid-open No. H7-220759
Patent Document 2: Japanese Patent Application Laid-open No. 2005-327680
Patent Document 3: Japanese Patent Application Laid-open No. 2008-159333

The providing of an insulating layer composed mainly of an insulating inorganic material on the surface of an electrode active material layer (for example, the porous protective film described in Patent Document 1, to be referred to as a "protective layer") contributes to preventing loss of the electrode active material, preventing internal short-circuiting and the like, and can be effective means for improving the reliability of a lithium secondary battery. However, when a protective layer containing a binder was formed on the surface of an electrode active material layer, since the binder in the protective layer penetrates into the electrode active material layer as charging and discharging are repeated, there was the risk of causing an increase in internal resistance or decrease in electrical conductivity and the like as compared with a lithium secondary battery of a configuration that does not have a protective layer.

DISCLOSURE OF THE INVENTION

Therefore, an object of the present invention is to provide a lithium secondary battery provided with an electrode having a protective layer containing an insulating filler and a binder on the surface of an electrode active material layer that is resistant to penetration of the binder of the protective layer into the electrode active material layer and inhibits increases in internal resistance, and to provide a manufacturing method thereof. In addition, an object of the present invention is to provide a vehicle provided with this lithium secondary battery.

In order to realize the above-mentioned objects, the battery provided by the present invention is a lithium secondary battery provided with: a negative electrode having a negative electrode current collector and a negative electrode active material layer containing a negative electrode active material and formed on a surface of the current collector; and a positive electrode having a positive electrode current collector and a positive electrode active material layer containing a positive electrode active material and formed on a surface of the current collector, wherein a protective layer containing an insulating filler and a binder is formed on at least one of the negative electrode active material layer and the positive electrode active material layer.

The layer density on a side facing the protective layer in the negative electrode active material layer and/or positive electrode active material layer where the protective layer is formed is higher than the layer density in a central portion and a side facing the current collector in the negative electrode active material layer and/or positive electrode active material layer where the protective layer is formed.

In addition, in a preferable aspect, the protective layer is formed on the negative electrode active material layer (for example, is formed only on the negative electrode active material layer).

Furthermore, in the present description, a "lithium secondary battery" refers to a secondary battery that uses lithium ions as electrolyte ions and realizes charging and discharging by migration of charge accompanying migration of lithium ions between positive and negative electrodes. Secondary batteries that are commonly referred to as lithium ion batteries are typical examples of secondary batteries that are included in the lithium secondary battery in the present description.

In addition, a "negative electrode active material" refers to an active material on a negative electrode that enables the reversible occlusion and release (and typically, insertion and separation) of a chemical species (here, lithium ions) serving as a charge carrier in a secondary battery. A "positive electrode active material" refers to an active material on a positive electrode that enables the reversible occlusion and release of a chemical species serving as a charge carrier.

Since the lithium secondary battery of this configuration has a protective layer containing an insulating filler and a binder on the surface of a negative electrode active material layer and/or positive electrode active material layer (which may be collectively referred to as an "electrode active material layer" for the sake of convenience in the case of referring to at least one of the negative electrode active material layer and the positive electrode active material layer), clogging of the separator caused by pieces separated from an electrode active material layer having the protective layer is prevented in advance. Thus, according to the present invention, a highly reliable lithium secondary battery (and typically, a lithium ion battery) is provided in which internal short-circuiting is inhibited.

Moreover, in a lithium secondary battery having a protective layer of the prior art, there was the risk of the binder in the protective layer penetrating into the electrode active material layer and causing an increase in internal resistance and the like due to repeated charging and discharging (and particularly, during charging and discharging cycles that included discharging at a high output). However, in the electrode active material where the above-mentioned protective layer was formed that composes the lithium secondary battery according to the present invention (and typically, the negative electrode active material layer or both the negative electrode active material layer and the positive electrode active material layer), since the layer density on the side facing the protective layer in the electrode active material layer is higher than the layer density of a central portion and a side facing a current collector in the electrode active material layer (and typically, the entire electrode active material layer excluding those sites that contact the protective layer), it is difficult for the binder in the protective layer to penetrate into the electrode active material layer and increases in internal resistance are inhibited. As a result, a lithium secondary battery is provided having superior quality that is capable of realizing long-term use.

In addition, in another preferable aspect of the lithium secondary battery provided by the present invention, the insulating filler of the protective layer is composed of alumina particles.

An inorganic filler main composed of an inorganic material such as a ceramic material can be preferably used for the insulating filler that composes the protective layer. An inorganic filler such as an oxide, carbide or nitride can be used particularly preferably. A preferable example of this inorganic filler is alumina particles of an inorganic oxide filler (such as $\alpha$-alumina particles). In a lithium secondary battery provided with a negative electrode and/or positive electrode having a protective layer containing alumina particles (which may be collectively referred to as an "electrode" for the sake of convenience in the case of referring to at least one of the negative electrode and positive electrode), since separation of an electrode active material layer provided with the protective layer (and typically, the negative electrode active material layer or both the negative electrode active material layer and the positive electrode active material layer) is inhibited, internal short-circuiting can be prevented in advance. Thus, according to the present invention, a lithium secondary battery can be provided that has superior reliability.

In addition, in another preferable aspect of the lithium secondary battery provided by the present invention, the binder of the protective layer is made of a material that differs from the binder used in the negative electrode active material layer and/or positive electrode active material layer where the protective layer is formed.

In a battery of this aspect, by using, for example, a material capable of being dissolved in a non-aqueous solvent (organic solvent) for the binder of the protective layer that composes the outermost layer of an electrode (and typically, the negative electrode or both the negative electrode and positive electrode), and using a water-soluble and/or water-dispersible material for the binder of the electrode active material layer, the swelling resistance of the binder with respect to a non-aqueous electrolyte solution can be improved. As a result, a lithium secondary battery is provided that has superior quality capable of realizing long-term use.

In addition, the present invention provides a manufacturing method of a lithium secondary battery. Namely, the manufacturing method provided by the present invention is a method for manufacturing a lithium secondary battery provided with a negative electrode having a negative electrode active material layer containing a negative electrode active material and formed on the surface of a negative electrode current collector, and protective layer containing an insulating filler and a binder and formed on the negative electrode active material layer.

In this manufacturing method, a composition for forming a negative electrode active material layer containing the negative electrode active material is coated and compressed onto the negative electrode current collector, to prepare a negative electrode raw material on which is formed the negative electrode active material layer, the lithium secondary battery is configured so that an initial capacity ratio (N/P) of an initial capacity of the negative electrode raw material (N [mAh/cm$^2$]) to an initial capacity of the positive electrode (P [mAh/cm$^2$]) is 1.0 to 3.0, and a ratio (T1/T2) of a thickness (T1) of the negative electrode active material layer after coating the composition to a thickness (T2) of the negative electrode active material layer after compressing is set to a value that at least exceeds 2.0.

According to the manufacturing method of this aspect, as a result of preparing a negative electrode raw material provided with a negative electrode active material layer demonstrating an initial capacity of 1.0 to 3.0 relative to the initial capacity of the positive electrode, and simultaneously setting the ratio (T1/T2) of the thickness (T1) of the negative electrode active material layer after coating the composition to the thickness (T2) of the negative electrode active material layer after compressing to a value that at least exceeds 2.0, the layer density on a side facing the protective layer in the negative electrode active material layer is made to be higher than the layer density of a central portion and a side facing the negative electrode current collector in the negative electrode active material layer (and typically, the entire negative electrode active material layer excluding those sites that contact the protective layer). As a result, it becomes difficult for the binder in the protective layer to penetrate into the negative electrode active material layer and increases in internal resistance are inhibited. As a result, a method is provided for manufacturing a lithium secondary battery having superior reliability capable of realizing long-term use.

In addition, in another preferable aspect of the battery manufacturing method according to the present invention, the ratio (T1/T2) of the thickness (T1) of the negative electrode active material layer after coating the composition to the thickness (T2) of the negative electrode active material layer after compressing is 2.4 to 3.5.

In the manufacturing method of this aspect, in the case the ratio (T1/T2) is greater than the above-mentioned values, namely in the case the thickness of the negative electrode active material layer after coating is excessively thick and/or the thickness of the negative electrode active material layer after compressing is excessively thin, although it becomes difficult for the binder in the protective layer to penetrate into the negative electrode active material layer, electrical conductivity decreases. On the other hand, in the case the ratio (T1/T2) is less than the above-mentioned values, namely in the case the thickness of the negative electrode active material layer after coating is excessively thin and/or the thickness of the negative electrode active material layer after compressing is excessively thick, the binder in the protectively layer easily penetrates into the negative electrode active material layer. However, by setting the ratio (T1/T2) to be within the range of 2.4 to 3.5, in addition to it being difficult for the binder in the protective layer to penetrate into the negative electrode active material layer, internal resistance can be inhibited to the same level as the internal resistance of a lithium secondary battery employing a configuration that does not have a protective layer. As a result, a method is provided for manufacturing a lithium secondary battery that is capable of realizing long-term use. Moreover, by making the density of the negative electrode active material layer after compression constant at this time, a method is provided for manufacturing a lithium secondary battery having preferable strength of the negative electrode active material layer and having superior manufacturing stability.

Moreover, according to the present invention, a vehicle is provided that is provided with any of the lithium secondary batteries disclosed herein (lithium secondary batteries manufacturing according to any of the manufacturing methods disclosed herein). The lithium secondary battery is able to demonstrate quality and performance suitable for use as a lithium secondary battery installed in a vehicle. Thus, this lithium secondary battery can be preferably used as a power supply for a motor (electric motor) installed in a vehicle such as an automobile.

BEST MODE FOR CARRYING OUT THE INVENTION

The following provides an explanation of preferred embodiments of the present invention. Furthermore, unless specifically indicated otherwise in the present description, those matters required for carrying out the present invention can be understood to be design matters for a person with ordinary skill in the art based on prior art in the relevant fields. The present invention can be carried out based on contents disclosed in the present description and common general technical knowledge in the relevant fields.

The lithium secondary battery according to the present invention is characterized by forming a protective layer mainly composed of an insulating filler on the surface of at least one of a negative electrode active material layer and a positive electrode active material layer. Although the following provides a detailed explanation using the example of a rectangular lithium secondary battery provided with a negative electrode in which a protective layer composed in the manner described above is formed on the surface of the negative electrode active material layer, this is not intended to limit the present invention to such an embodiment. Namely, a lithium secondary battery provided with a positive electrode in which the protective layer is formed on the surface of a positive electrode active material layer, or a lithium secondary battery provided with electrodes in which the protective layer is formed on both the negative electrode active material layer and the positive electrode active material layer, can be a preferred embodiment of the present invention.

In addition, there are no particular limitations on the shape of the lithium secondary battery, and can be of a rectangular shape, flat shape or cylindrical shape and the like, and the shape, size and other constituents of the battery can be suitably modified according to the application (and typically, for mounting in a vehicle).

Furthermore, in the following drawings, those members and sites demonstrating the same actions are explained using the same reference symbols, and duplicate explanations are omitted or simplified. In addition, dimensional relationships (such as length, width or thickness) in each drawing do not reflect actual dimensional relationships.

Figure 1:
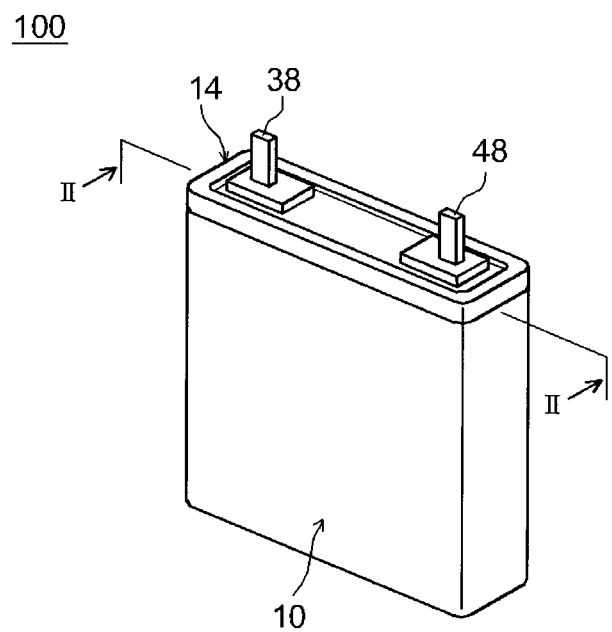
FIG. 1 is a perspective view schematically showing the exterior of a lithium secondary battery according to an embodiment.

FIG. 1 is a perspective view schematically showing a rectangular lithium secondary battery 100 according to an embodiment. In addition, FIG. 2 is a cross-sectional view taken along line II-II in FIG. 1, while FIG. 3 is a cross-sectional view schematically showing a portion of a laminated portion of a positive electrode 30, a negative electrode 40 and separators 50A and 50B that compose a wound-type electrode body 20.

As shown in FIG. 1, a lithium secondary battery 100 according to the present embodiment is provided with a rectangular battery case 10 and a cover 14 that covers an opening 12 of the case 10. A flat electrode body (wound-type electrode body 20) and an electrolyte solution can be housed in the battery case 10 through this opening 12. In addition, a positive electrode terminal 38 and a negative electrode terminal 48 for connecting to the outside are provided in the cover 14, and portions of these terminals 38 and 48 protrude from the surface of the cover 14.

Figure 2:
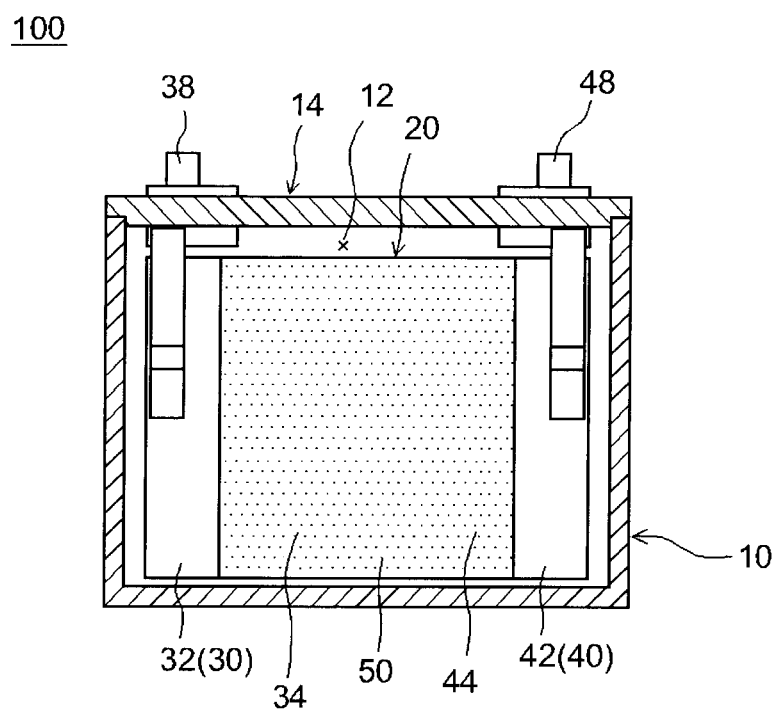
FIG. 2 is a cross-sectional view taken along line II-II in FIG. 1.
Figure 3:
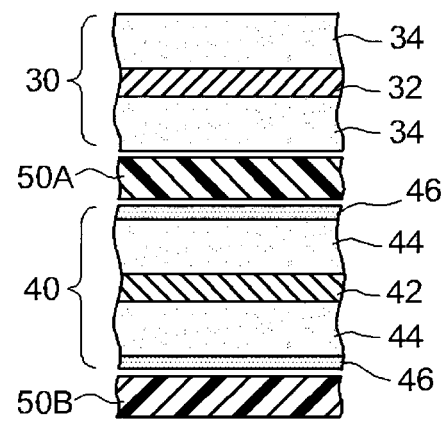
FIG. 3 is a cross-sectional view showing a positive electrode and a separator that compose a wound-type electrode body according to an embodiment.
Figure 4:
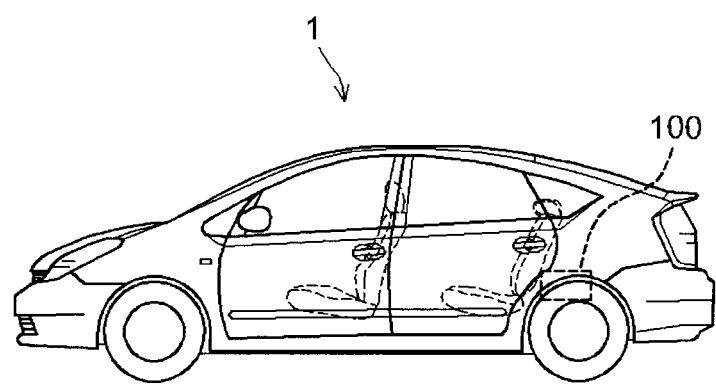
FIG. 4 is a side view schematically showing a vehicle (automobile) provided with the lithium secondary battery of the present invention.

As shown in FIGS. 2 and 3, the wound-type electrode body 20 is housed within the case 10 in the present embodiment. This electrode body 20 is composed of a positive electrode sheet 30 having a positive electrode active material layer 34 on the surface of a positive electrode current collector 32 in the form of a long sheet, a negative electrode sheet 40 having a negative electrode active material layer 44 and a protective layer 46 on the surface of a negative electrode current collector 42 in the form of a long sheet, and separators 50A and 50B in the form of long sheets, the positive electrode sheet 30 and the negative electrode sheet 40 are wound while superimposing the two separators 50A and 50B, and the resulting wound-type electrode body 20 is formed into a flat shape by crushing by pressing from the lateral directions.

In addition, in the wound positive electrode sheet 30, the positive electrode current collector 32 is exposed on one end portion along the lengthwise direction thereof where the positive electrode active material layer 34 is not formed, while on the other hand in the wound negative electrode sheet 40, the negative electrode current collector 42 is exposed on one end portion along the lengthwise direction thereof where the negative electrode active material layer 44 and the protective layer 46 are not formed. The positive electrode terminal 38 on the exposed end portion of the positive electrode current collector 32 and the negative electrode terminal 48 on the exposed end portion of the negative electrode current collector 42 are respectively joined and electrically connected to the positive electrode sheet 30 or the negative electrode sheet 40 of the wound-type electrode body 20 formed into a flat shape. The positive and negative electrode terminals 38 and 48 and the positive and negative electrode current collectors 32 and 42 can be respectively joined by, for example, ultrasonic welding or resistance welding.

An explanation is first provided of each constituent feature of the lithium secondary battery 100 according to the present embodiment.

The positive electrode disclosed herein has the positive electrode active material layer 34 containing a positive electrode active material and formed on the surface of the positive electrode current collector 32. An electroconductive member composed of a metal having satisfactory electrical conductivity is preferable used for the positive electrode current collector 32. For example, aluminum or an alloy composed mainly of aluminum can be used. There are no particular limitations on the shape of the positive electrode current collector 32 since it can differ corresponding to the shape and so forth of the lithium secondary battery, and can be of various shapes such as a rod, plate, sheet, foil or mesh. A sheet-like aluminum positive electrode current collector 32 is used in the present embodiment, and can be preferably used in the lithium secondary battery 100 provided with the wound-type electrode body 20.

In addition, a material enabling reversible occlusion and release of lithium ions is used for the positive electrode active material, and oxide-based positive electrode active materials or oxide-based positive electrode active materials having a spinel structure conventionally used in lithium secondary batteries can be used preferably. Examples include complex oxides of lithium and transition metals such as lithium-nickel-based complex oxides, lithium-cobalt-based complex oxides or lithium-manganese-based complex oxides.

Here, lithium-nickel-based complex oxides include oxides having lithium (Li) and nickel (Ni) as constituent metal elements thereof, as well as oxides containing at least one other type of metal element in addition to lithium and nickel (namely, a transition metal element and/or typical metal element other than Li and Ni), and typically, at a ratio lower than that of nickel (ratio based on number of atoms that is lower than Ni in terms of the total amount of metal elements other than Li and Ni in the case of containing two or more types of metal elements). A metal element other than Li and Ni as described above can be one type or two or more types of metal elements selected from the group consisting of cobalt (Co), aluminum (Al), manganese (Mn), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La) and cerium (Ce).

Furthermore, this applies similarly to lithium-cobalt-based complex oxides and lithium-manganese-based complex oxides.

One type or two or more types of materials able to be incorporated in typical lithium secondary batteries can also be contained as necessary in the composition for forming a positive electrode active material layer in addition to the positive electrode active material as described above. Examples of such materials include various types of polymer materials capable of functioning as a binder.

In the case of using a composition for forming a positive electrode active material layer prepared in the form of a paste or slurry using an aqueous solvent, a water-soluble polymer material that dissolves in water is preferable for the polymer material. Examples include carboxymethyl cellulose (CMC), methyl cellulose (MC), cellulose acetate phthalate (CAP), hydroxypropyl methyl cellulose (HPMC), hydroxypropyl methyl cellulose phthalate (HPMCP) and polyvinyl alcohol (PVA). In addition, a polymer material that disperses in water (water-dispersible polymer material) can be used preferably. Examples include fluorine-based resins such as polytetrafluoroethylene (PTFE), tetrafluoroethylene-perfluoroalkylvinyl ether copolymer (PFA), tetrafluoroethylene-hexafluoropropylene copolymer (FEP) or ethylene-tetrafluoroethylene copolymer (ETFE), vinyl acetate copolymers, styrene-butadiene copolymers (SBR), acrylic acid-modified SBR resins (SBR-based latex) and gums such as gum arabic.

Alternatively, in the case of using a composition for forming a positive electrode active material layer prepared in the form of a paste or slurry using a non-aqueous solvent (organic solvent), examples of polymer materials that can be used include polyvinylidene fluoride (PVDF), polyvinylidene chloride (PVDC), polyethylene oxide (PEO), polypropylene oxide (PPO) and polyethylene oxide-polypropylene oxide copolymer (PEO-PPO).

Furthermore, the examples of polymer materials indicated above can also be used as thickeners and various types of additives in addition to being used as binders.

Moreover, an electroconductive material can also be added to the composition for forming a positive electrode active material layer. Electroconductive powder materials such as carbon powder or carbon fibers are preferably used for the electroconductive material. Various types of carbon black, such as acetylene black, furnace black, ketjen black or graphite powder are preferable for use as carbon powder. In addition, electroconductive fibers such as carbon fibers or metal fibers, metal powders such as copper or nickel, and organic electroconductive materials such as polyphenylene derivatives can also be contained either alone or as a mixture. Furthermore, one type of these materials may be used alone or two or more types may be used in combination.

The positive electrode active material layer 34 can be preferably produced by adding a positive electrode active material, the above-mentioned binder and/or an additive such as an electroconductive material to a suitable solvent (water, organic solvent and mixed solvent thereof) and dispersing or dissolving therein, followed by coating the prepared composition for forming a positive electrode active material layer in the form of a paste or slurry onto the positive electrode current collector 32 and drying the solvent.

A technique similar to conventionally known methods can be suitably employed for coating the composition for forming a positive electrode active material layer onto the positive electrode current collector 32. For example, the composition may be coated onto the surface of the current collector 32 by using a suitable coating device such as a slit coater, die coater or comma coater. In addition, the solvent can be satisfactorily dried by using air drying, hot air drying, low humidity drying, vacuum drying, infrared light, far infrared light or an electron beam either alone or in combination.

Next, an explanation is provided of each constituent feature of the negative electrode of the lithium secondary battery 100 according to the present embodiment. The negative electrode disclosed herein has the negative electrode active material layer 44 containing a negative electrode active material and formed on the surface of the negative electrode current collector 42, and the protective layer 46 containing an insulating filler and a binder and formed on the negative electrode active material layer 44.

First, an electroconductive member composed of a metal having satisfactory electrical conductivity is preferably used for the negative electrode current collector 42. For example, copper or an alloy composed mainly of copper can be used. There are no particular limitations on the shape of the negative electrode current collector 42 since it can differ corresponding to the shape and the like of the lithium secondary battery in the same manner as the positive electrode current collector 32. A sheet-like negative electrode current collector 42 made of copper is used in the present embodiment, and can be preferably used in the lithium secondary battery 100 provided with the wound-type electrode body 20.

One type or two or more types of materials conventionally used in lithium secondary batteries can be used without any particular limitations for the negative electrode active material. A preferable example of a negative electrode active material is carbon particles. A particulate carbon material (carbon particles) containing a graphite structure (lamellar structure) in at least a portion thereof is used preferably. Carbon materials having a so-called graphitous material (graphite), non-graphitizable carbon (hard carbon) or graphitizable carbon (soft carbon) structure or any combination thereof can also be used preferably. Among these, graphite particles can be used particularly preferably. Graphite particles have superior electrical conductivity since they are able to preferably occlude lithium ions as a charge carrier. In addition, they allow the obtaining of a negative electrode active material suitable for rapid charging and discharging (such as high-output discharging) since they have a small particle diameter and large surface area per unit volume.

One type or two or more types of materials able to be incorporated in typical lithium secondary batteries can also be contained as necessary in the composition for forming a negative electrode active material layer in addition to the negative electrode active material as described above. Various types of polymer materials able to function as binders listed as examples for the positive electrode as previously described can be preferably used as such materials.

The negative electrode in the technology described herein can be produced by forming the negative electrode active material layer 44 containing the negative electrode active material on the surface of the negative electrode current collector 42, followed by forming the protective layer 46 containing an insulating filler and binder on the negative electrode active material layer 44. Namely, the negative electrode of this aspect can be produced by producing an electrode on which the protective layer 46 is not yet formed on the surface of the negative electrode active material layer 44 (to be referred to as a "negative electrode raw material"), followed by forming the protective layer 46 on the surface of the negative electrode active material layer 44 in this negative electrode raw material.

The negative electrode raw material layer of the negative electrode raw material is formed by first adding the negative electrode active material and one or two or more types of the polymer material described above to a suitable solvent and dispersing or dissolving therein, followed by coating the prepared composition for a negative electrode active material layer in the form of a paste or slurry onto the negative electrode current collector 42, drying and then compressing.

In general, in the case the thickness of the negative electrode active material layer 44 that occludes a charge carrier is excessively thick, internal resistance increases and electrical conductivity decreases. On the other hand, in the case the negative electrode active material layer 44 is excessively thin, although resistance is inhibited, voids for occluding the charge carrier decrease, thereby resulting in the problem of a decrease in battery capacity. In addition, in the case of a negative electrode of an aspect in which the protective layer 46, which is used to prevent loss of the negative electrode active material layer 44, is provided on the surface of the negative electrode active material layer 44 as in the lithium secondary battery 100 according to the present invention, the binder contained in the protective layer 46 gradually penetrates into the negative electrode active material layer 44 due to repeated charging and discharging, resulting in the risk of an increase in internal resistance. Thus, in a negative electrode having the protective layer 46, it is preferably provided with the negative electrode active material layer 44 in which increases in internal resistance have been suppressed and penetration of binder from the protective layer 46 has been inhibited by adjusting the thickness of the negative electrode active material layer 44.

Therefore, the negative electrode (negative electrode raw material) in the technology disclosed herein attempts to form a negative electrode active material layer provided with a preferable thickness by setting the ratio (T1/T2) of the thickness (T1) of the negative electrode active material layer after coating the composition for forming a negative electrode active material layer onto the negative electrode current collector 42 to the thickness (T2) of the negative electrode active material layer after compressing to within a described value. Namely, by adjusting the ratio (T1/T2) of the thickness of the negative electrode active material layer 44 after coating (T1) to that after compressing (T2) to be within a prescribed value, a negative electrode active material can be produced that is provided with a negative electrode active material layer 44 that has low internal resistance and inhibits penetration of a binder from the protective layer 46. This ratio (T1/T2) is preferably within a value that at least exceeds 2.0, is more preferably within a range of 2.4 to 3.5, and is particularly preferably within a range of 2.4 to 3.3.

Furthermore, the relationship of the ratio (T1/T2) between the thickness of the negative electrode active material layer 44 after coating (T1) to that after compressing (T2) can be applied to either the case in which the negative electrode active material layer 44 is formed on one side of the negative electrode current collector 42 or the case in which it is formed on both sides. In the present embodiment, a mode is employed for the negative electrode raw material in which the negative electrode active material layer 44 is formed on both sides of the negative electrode current collector 42.

In producing the negative electrode raw material, a technique similar to a conventionally known method can be suitably employed for the method used to coat the composition for forming a negative electrode active material layer on the negative electrode current collector 42. For example, the composition can be preferably coated onto the negative electrode current collector 42 by using a suitable coating device such as a slit coater, die coater or comma coater. In addition, a negative electrode active material layer of a desired thickness is preferably formed while adjusting the amount coated by providing these coating devices with a discharge quantity meter that detects the coating amount of the composition.

In addition, a compression method such as a conventionally known roll pressing method or plate pressing method can be employed for the compression method. At this time, compression may be carried out a plurality of times to a desired thickness by measuring the thickness with a film thickness measuring instrument and adjusting the compression pressure. Compression demonstrates the effect of increasing layer density of the compressed layer on the side that contacts the rollers of the device.

As a result of using the method described above to make the ratio (T1/T2) between the thickness of the negative electrode active material layer 44 after coating (T1) and after compressing (T2) to at least exceed 2.0, or in other words, to compress to a thickness that is at least 50% or less of the thickness of the negative electrode active material layer 44 after coating, the negative electrode active material layer 44 can be formed that is provided with a preferable thickness in which the layer density of the negative electrode active material layer 44 on the side facing the protective layer 46 is higher than the layer density of the negative electrode active material layer 44 at a central portion and the side facing the negative electrode current collector 42.

Here, in the case the ratio (T1/T2) is lower than the above-mentioned values, namely in the case the thickness of the negative electrode active material layer 44 after coating is excessively thin and/or in the case the thickness of the negative electrode active material layer 44 after compressing is excessively thick, since the layer density of the negative electrode active material layer 44 on the side facing the protective layer 46 is not increased, binder in the protective layer 46 easily penetrates into the negative electrode active material layer 44. On the other hand, in the case the ratio (T1/T2) exceeds the above-mentioned values, namely in the case the thickness of the negative electrode active material layer 44 after coating is excessively thick and/or in the case the thickness of the negative electrode active material layer 44 after compressing is excessively thin, although it is difficult for binder in the protective layer 46 to penetrate into the negative electrode active material layer 44, electrical conductivity decreases. Thus, a lithium secondary battery capable of long-term use is provided in which penetration of binder is inhibited by setting the ratio (T1/T2) to within the prescribed values described above.

In addition, in the technology disclosed herein, the mass of the active material possessed by the negative electrode raw material (amount of the negative electrode active material contained in the negative electrode active material layer 44 retained per unit surface area of the negative electrode current collector, or the total amount of negative electrode active material contained in both negative electrode active material layers 44 in a negative electrode raw material of a configuration in which the negative electrode active material layer 44 is retained on both sides of the negative electrode current collector) is preferably adjusted so that the initial capacity (N) per unit surface area of the negative electrode current collector obtained by forming the negative electrode active material layer 44 on the negative electrode current collector 42 is 1.0 to 3.0 times the initial capacity (P) per unit surface area of the positive electrode (namely, so that the initial capacity ratio (N/P), representing the initial capacity (N) of the negative electrode raw material/initial capacity (P) of the positive electrode, is 1.0 to 3.0). This adjustment of the mass of the negative electrode active material can be carried out by, for example, suitably setting the amount of the negative electrode active material composition coated per unit surface area of the negative electrode current collector 42 (coated amount as solid).

The above-mentioned initial capacity ratio (N/P) of the positive and negative electrodes is preferably 1.0 to 3.0 and more preferably 1.3 to 2.8. In a lithium secondary battery in which the initial capacity ratio (N/P) is less than the above-mentioned ranges, initial resistance tends to increase as compared with a lithium secondary battery not having the protective layer 46. On the other hand, in a lithium secondary battery in which the initial capacity ratio (N/P) exceeds the above-mentioned ranges, the value of irreversible capacity increases relative to initial capacity of the battery, and the battery capacity per constant volume tends to decrease. By making the initial capacity ratio (N/P) to be within the above-mentioned ranges, the lithium secondary battery 100 can be realized that has favorable electrical conductivity free of increases in internal resistance even in the case of a battery employing a configuration in which the protective layer 46 is formed.

The initial capacity (N) of the negative electrode raw material as described above can be measured using, for example, the method described below. Namely, a measurement cell is constructed by using the negative electrode stamped out to a prescribed size as a measurement electrode and a lithium metal electrode as a counter electrode. The initial capacity per unit surface area of the negative electrode raw material (N [mAh/cm$^2$]) is determined by carrying out an initial charge/discharge cycle in which lithium ions are inserted into a negative electrode active material until the potential of the measurement electrode of the measurement cell becomes 0.01 V (based on lithium metal; lithium metal reference voltage is represented as "V (versus Li/Li$^+$)"), after which lithium ions are released (and typically, lithium ions are released until the potential of the measurement electrode becomes 0.5 V (versus Li/Li$^+$).

In addition, the initial capacity (P) of the positive electrode as described above can be measured using, for example, the method described below. Namely, a measurement cell is constructed by using the positive electrode stamped out to a prescribed size as a measurement electrode and a lithium metal electrode as a counter electrode. The initial capacity per unit surface area of the positive electrode (P [mAh/cm$^2$]) is determined by carrying out an initial charge/discharge cycle in which lithium ions are dissociated from a positive electrode active material until the potential of the measurement electrode of the measurement cell becomes 4.3 V (versus Li/Li$^+$), after which lithium ions are inserted into the positive electrode active material (and typically, lithium ions are inserted until the potential of the measurement electrode becomes 3.0 V (versus Li/Li$^+$).

There are no particular limitations on the coated amount of the composition per unit surface area, and the shape, target performance and the like of the negative electrode and battery can suitably differ provided the thickness ratio (T1/T2) between the thickness of the negative electrode active material layer after coating and after compressing and the initial capacity ratio (N/P) between the positive and negative electrodes are within the above-mentioned ranges. For example, in the case of producing a negative electrode to be used in the construction of the lithium secondary battery 100 provided with the wound-type electrode body 20, the composition on the surface of the current collector is coated so that the coated amount as solid is about 2.5 to 8.5 mg/cm$^2$.

In addition, from the viewpoints of production stability, production efficiency and the like, the density of the negative electrode active material layer 44 after compressing as described above is preferably set to a constant density of about 1.0 to 1.5 g/cm$^3$, and for example, 1.4 g/cm$^3$. A value calculated from (coated amount as solid per unit surface area)/(thickness of negative electrode active material layer after compressing (T2)) can be preferably used for the value of the density of the negative electrode active material layer 44 in the technology disclosed herein. The coated amount as solid per unit surface area can be calculated by a discharge quantity meter provided in the coating device as previously described, while a value measured with a film thickness measuring instrument as previously described can be used for the thickness of the negative electrode active material layer after compressing (T2).

Next, the protective layer 46 containing an insulating filler and a binder is formed on the negative electrode active material layer 44 of the above-mentioned negative electrode raw material. The protective layer 46 of the negative electrode disclosed herein may be formed over nearly the entire range of the surface of the negative electrode active material layer 44, or may be formed only a portion of the range of the surface of the negative electrode active material layer 44. Normally, a configuration is preferably employed in which the protective layer 46 is formed so as to at least cover nearly the entire range of the surface of the negative electrode active material layer 44 from the viewpoints of the effect of forming the protective layer 46, durability of the protective layer 46 and the like. Furthermore, in the case a portion where the negative electrode active material layer 44 is not formed remains on a portion of the negative electrode current collector 42 in a negative electrode of an aspect in which the negative electrode active material layer 44 is formed on the negative electrode current collector 42, a configuration may also be employed in which a portion of the protective layer 46 is provided extending to the portion where the negative electrode active material layer 44 is not formed within a range that does not remarkably impair the effects of the present invention.

A filler mainly composed of various inorganic materials and/or organic materials that are non-electrically conductive (such as resin materials, paper or wood) can be used for the insulating filler that composes the protective layer 46. From the viewpoints of durability and reliability, an inorganic filler mainly composed of an inorganic material is used preferably. For example, particles composed of a non-electrically conductive inorganic compound (ceramic particles) can be preferably used for the insulating filler. The inorganic compound can be an oxide, carbide, silicide or nitride and the like of a metal element or non-metal element. From the viewpoints of chemical stability, raw material cost and the like, an inorganic oxide filler composed of oxide particles such as alumina ($Al_2O_3$), silica ($SiO_2$), zirconia ($ZrO_2$) or magnesia (MgO) particles can be used preferably. In addition, inorganic silicide fillers composed of silicide particles such as silicon carbide (SiC) particles, and inorganic nitride fillers composed of nitride particles such as aluminum nitride (AlN) can also be used. Alumina particles (such as α-alumina particles) are used particularly preferably for the insulating filler. Alumina particles are able to be particles having the physical property of a plurality of primary particles being linked. Such linked particles can be manufactured based on common general technical knowledge in the relevant field, or an applicable commercially available product can be acquired.

In addition, one type or two or more types of polymers can be used for the binder that composes the protective layer 46 that are suitably selected from the polymers listed as examples of binders able to be incorporated in the composition for forming a negative electrode active material layer as previously described. Although the binder used to form the negative electrode active material layer 44 and the binder used to form the protective layer 46 may be the same or different, an aspect in which the binders used to form both the layers 44 and 46 are mutually different types of binders is more preferable. For example, a water-soluble binder (such as CMC) and/or a water-dispersible binder (such as SBR) can be used for one of the negative electrode active material layer 44 and the protective layer 46, while a binder soluble in organic solvent (such as PVDF) can be used for the other. As a result, since the solvent of a composition for forming a protective layer to be described later and the solvent of the composition for forming a negative electrode active material layer are able to use different solvents (water or organic solvents), swelling resistance of the binder with respect to electrolyte solution is improved a lithium secondary battery provided with a negative electrode on which the protective layer is formed.

A method in which a composition for forming a protective layer in the form of a paste or slurry, in which the insulating filler and binder are dispersed or dissolved in a suitable solvent, is coated onto the surface of the negative electrode active material layer 44 followed by drying the coated solvent can be preferably used to form the protective layer 46 on the surface of the negative electrode active material layer 44. Water or organic solvent, or a mixed solvent of water and organic solvent, can be used for the solvent. Furthermore, the solvent used in the composition for forming a negative electrode active material layer and the solvent used in the composition for forming a protective layer may be the same or different. For example, a solvent that differs from the solvent of the composition for forming a negative electrode active material layer can be preferably used for the solvent of the composition for forming a protective layer. As a result of forming a protective layer by coating an organic solvent-based composition for forming a protective layer (and typically, containing a binder able to dissolve in a prescribed organic solvent) on a negative electrode active material layer formed by using an aqueous composition for forming a negative electrode active material layer (and typically, containing a water-soluble binder and/or water-dispersible binder), the effect is obtained in which swelling and the like, resulting from the coated composition having an effect on the state of the negative electrode active material layer, can be avoided.

In addition, an example of another method of forming the protective layer 46 on the negative electrode active material layer 44 involves coating a composition for forming a protective layer, in the form of a powder and containing thermoplastic resin particles (such as polyolefin particles or EVA particles) as binder and an insulating filler, onto the negative electrode active material layer 44 followed by heating the coated composition to cause the insulating filler to be adhered by the thermoplastic resin particles.

The lithium secondary battery able to be provided by the present invention is similar to that provided for use as this type of lithium secondary battery in the prior art with the exception of using a negative electrode configured in the manner previously described, and there are no particular limitations thereon. Although the following provides an explanation of other constituents, this explanation is not intended to limit the present invention to these embodiments.

For example, an electrolyte solution similar to an electrolyte solution used in a conventional lithium secondary battery can be used without any particular limitations for the electrolyte solution. This electrolyte solution is typically a non-aqueous electrolyte solution having a composition that contains a supporting salt in a suitable non-aqueous solvent. One type or two or more members selected from the group consisting of, for example, propylene carbonate (PC), ethylene carbonate (EC), diethyl carbonate (DEC), dimethyl carbonate (DMC) and ethyl methyl carbonate (EMC) can be used for the non-aqueous solvent. In addition, one type or two or more types of lithium compounds (lithium salts) selected from the group consisting of $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$ and LiI can be used for the supporting salt in the case of a lithium secondary battery.

In addition, a material that prevents current short-circuiting caused by contact of both electrodes and allows the passage of lithium is preferable for the separators 50A and 50B arranged between the positive electrode 30 and the negative electrode 40, and for example, a porous film composed of a polyolefin resin such as polyethylene or polypropylene can be used preferably.

Moreover, there are no particular limitations on the structure, size or materials (such as being made of metal or a laminated film) of the battery case, or on the structure (such as a wound structure or lamellar structure) of the electrode bodies used as main constituent elements of the positive and negative electrodes.

Figure 6:
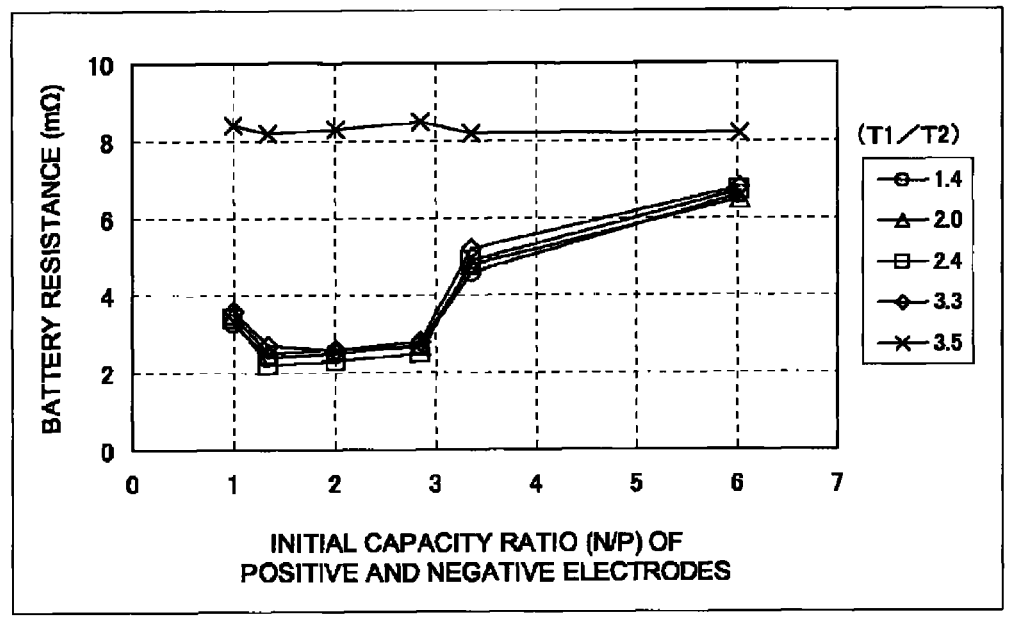
FIG. 6 is a graph indicating the results of measuring internal resistance of lithium secondary batteries using a negative electrode raw material for the negative electrode; and, FIG. 7 is a graph indicating ratios (resistance ratios) of the internal resistance of lithium secondary batteries provided with a negative electrode on which a protective layer is formed to the internal resistance of lithium secondary batteries provided with a negative electrode raw material for the negative electrode.

In addition, FIG. 6 is a drawing showing a vehicle 1 equipped with the lithium secondary battery 100. As has been previously described, the lithium secondary battery 100 according to the present invention is resistant to penetration of binder present in the protective layer into the negative electrode active material layer, and does not demonstrate increases in internal resistance caused by formation of the protective layer. As a result of having these characteristics, the lithium secondary battery 100 according to the present invention can be particularly preferably used as a power supply for a motor (electric motor) installed in a vehicle such as an automobile. Thus, as is schematically shown in FIG. 6, a vehicle 1 (and typically, and automobile, and particularly an automobile provided with an electric motor in the manner of a hybrid vehicle, electric vehicle or fuel cell vehicle) is provided that is equipped with the lithium secondary battery 100 (which may be in the form of a battery assembly in which a plurality of the lithium secondary batteries 100 are connected in series) as a power supply thereof.

Although the following provides an explanation of test examples relating to the present invention, this explanation is not intended to limit the present invention to that indicated in the specific examples.

<Production of Lithium Secondary Battery Provided with Negative Electrode Raw Material>

First, a negative electrode raw material having a negative electrode active material layer on the surface of a negative electrode current collector was produced. Namely, natural graphite as a negative electrode active material, styrene-butadiene rubber (SBR) and carboxymethyl cellulose (CMC) were mixed with ion exchange water so that the ratio of the percentages by weight of these materials was 98:1:1 to prepare a composition for forming a negative electrode active material layer. This composition for forming a negative electrode active material layer was then coated onto both sides of copper foil having a thickness of about 10 μm as a negative electrode current collector so that the coated amount (as solid) thereof was within the range of about 2.5 to 18 g/cm². Six types of samples (Samples 1 to 6) were then prepared in which different amounts of the composition for forming a negative electrode active material layer were coated onto the surface of the negative electrode current collector.

Moreover, after drying the Samples 1 to 6 having different coated amounts, the samples were compressed with a roll press. At this time, the ratio (T1/T2) of the thickness (T1) of the negative electrode active material layer after coating the composition to the thickness (T2) of the negative electrode active material layer after compressing was adjusted to 1.4 (Sample A), 2.0 (Sample B), 2.4 (Sample C), 3.3 (Sample D) or 3.5 (Sample E) to prepare five types of samples (Samples A to E) having different thickness ratios (T1/T2). Namely, a total of 30 types (Sample 1-A, 1-B, 1-C, 1-D, 1-E, 2-A, . . . 6-D, 6-E) of negative electrode raw materials were prepared provided with negative electrode active material layers in which the ratio (T1/T2) was adjusted to the values indicated above for each of the Samples 1 to 6 having different coated amounts. The layer density of the negative electrode active material layers after compressing in the above manner was 1.4 g/cm².

Furthermore, the term "Sample Group A" is used when referring to all of the Samples 1-A, 2-A, 3-A, 4-A, 5-A and 6-A having a ratio (T1/T2) of 1.4. This applies similarly to the other samples as well.

Next, a positive electrode (positive electrode sheet) was produced. Namely, lithium nickel oxide ($LiNiO_2$) as a positive electrode active material, polytetrafluoroethylene (PTFE) and carboxymethyl cellulose (CMC) were mixed with ion exchange water so that the ratio of the percentages by weight of these materials was 94:5:1 to prepare a composition for forming a positive electrode active material layer. This composition for forming a positive electrode active material layer was then coated onto both sides of sheet-like aluminum foil having a thickness of about 10 μm as a positive electrode current collector followed by drying and compressing to obtain a positive electrode sheet.

The respective initial capacities of the positive electrode sheet and negative electrode raw materials were measured. Namely, a measurement electrode was prepared by stamping out the positive electrode sheet to a prescribed size (circle having an area of 2 cm²). This measurement electrode was arranged in opposition to a lithium metal foil (counter electrode) of the same size with a polypropylene separator having a thickness of 25 μm interposed there between, and then incorporated in a stainless steel container along with electrolyte solution to construct a measurement cell having a thickness of 2 mm and diameter of 32 mm (2032 type). A solution obtained by dissolving $LiPF_6$ supporting salt at a concentration of 1 mol/L in a mixed solvent of ethylene carbonate (EC) and ethyl methyl carbonate (EMC) having a volume ratio of 3:7 was used for the electrolyte solution.

Lithium ions were then dissociated from the positive electrode active material in the measurement cell described above at current density of 0.1 mA/cm² until the potential of the measurement electrode reached 4.3 V (versus Li/Li⁺), after which lithium ions were inserted at a current density of 0.1 mA/cm² until the potential of the measurement electrode reached 3.0 V (versus Li/Li⁺) to determine the initial capacity P (mAh/cm²) per unit surface area of the positive electrode sheet.

In addition, a measurement electrode was also prepared by stamping out the negative electrode raw materials to a prescribed size (circle having an area of 2 cm²). This measurement electrode was arranged in opposition to a lithium metal foil (counter electrode) of the same size with a polypropylene separator having a thickness of 25 μm interposed there between, and then incorporated in a stainless steel container along with a non-aqueous electrolyte solution to construct a 2032 type measurement cell.

Lithium ions were then inserted into the negative electrode active material in the measurement cell described above at current density of 0.1 mA/cm² until the potential of the measurement electrode reached 0.01 V (versus Li/Li⁺), after which lithium ions were released at a current density of 0.1 mA/cm² until the potential of the measurement electrode reached 0.5 V (versus Li/Li⁺) to determine the initial capacity N (mAh/cm²) per unit surface area of the negative electrode raw material.

The ratio of initial capacity (N/P) of the positive and negative electrodes was calculated from the results of measuring the initial capacity P (mAh/cm²) per unit surface area of the positive electrode sheet and the initial capacity N (mAh/cm²) per unit surface area of the negative electrode raw material. As a result, the (N/P) ratios for Samples Groups 1 to 6 were 1.00 (Sample Group 1), 1.34 (Sample Group 2), 2.01 (Sample Group 3), 2.85 (Sample Group 4), 3.35 (Sample Group 5) and 6.03 (Sample Group 6), respectively.

Figure 5:
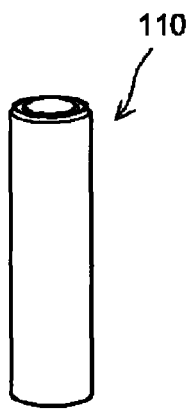
FIG. 5 is a perspective view schematically showing an 18650 type lithium secondary battery produced in an example.

Cylindrical lithium secondary batteries (battery 110 in FIG. 5) having a diameter of 18 mm and height of 65 mm (18650 type) were produced according to the procedure described below for the Samples 1 to 6 having different initial capacity ratios (N/P) obtained in the manner described above by using the total of 30 types of Samples A to E having different ratios (T1/T2) between the thickness (T1) of the negative electrode active material layer after coating the composition and thickness (T2) of the negative electrode active material layer after compressing, and the positive electrode (positive electrode sheet) previously described.

The negative electrode raw material and the positive electrode sheet were laminated with two polypropylene separators having a thickness of 25 μm and the laminated sheet was wound to produce a wound-type electrode body. This electrode body was then housed in a container with an electrolyte solution of the same composition as the electrolyte solution used in the measurement cell followed by sealing the opening of the container to construct lithium secondary batteries.

<Measurement of Internal Resistance>

The internal resistance of each lithium secondary battery at 25° C. was measured. Namely, each battery was adjusted to an SOC (state of charge) of 60% by constant-current, constant-voltage (CC-CV) charging under temperature conditions of 25° C. Subsequently, charging and discharging were then alternately carried out for 10 seconds under conditions of 0.2 C, 0.5 C and 1 C at 25° C., and voltage values at 10 seconds after the start of discharging were plotted to produce an I-V characteristics graph. Internal resistance of the batteries at 25° C. was then calculated from the slope of the I-V characteristics graph. The measurement results are shown in FIG. 6.

As is clear from the results shown in FIG. 6, when first focusing on the initial capacity ratios (N/P) of the positive and negative electrodes, internal resistance was confirmed to increase the larger the (N/P) ratio.

More specifically, the batteries of the Sample 5 Group (3.35) and Sample 6 Group (6.03) having large (N/P) ratios demonstrated resistance values of 4 mΩ or more that were greater than those of other sample groups. On the other hand, the batteries of the Sample 1 Group (1.00) to Sample 4 Group (2.85) having small (N/P) ratios demonstrated resistance values of less than 4 mΩ, and were confirmed to have low internal resistance. The batteries of Sample Group 2 in which the (N/P) ratio was 1.34 demonstrated the lowest resistance values. However, Sample Group E in which the ratio (T1/T2) was 3.5 is excluded in all cases.

Next, when focusing on the ratio (T1/T2) of the thickness of the negative electrode active material layer after coating (T1) to that after compressing (T2), the batteries of Sample Group 5 in which (T1/T2) was 3.5 demonstrated high internal resistance values of 8 mΩ or more regardless of the initial capacity ratio (N/P) of the positive and negative electrodes. However, in cases other than Sample Group E in which the ratio (T1/T2) was 3.5, namely in the batteries of Sample Group A, in which the ratio (T1/T2) was 1.4, to Sample Group D, in which the ratio (T1/T2) was 3.3, internal resistance values were roughly the same.

On the basis of these results, in lithium secondary batteries provided with a negative electrode not having a protective layer, the internal resistance of the batteries of Sample Group 1, in which the (N/P) ratio was 1.00 to Sample Group 4, in which the (N/P) ratio was 2.85, was indicated to be low. In addition, the internal resistance of the batteries of Sample Group A, in which the ratio (T1/T2) of the thickness of the negative electrode active material layer after coating (T1) to that after compressing (T2) was 1.4, to Sample Group D, in which the ratio (T1/T2) was 3.3, was also confirmed to be low.

<Production of Lithium Secondary Batteries Provided with Negative Electrode Having a Protective Layer>

A protective layer was formed on the negative electrode active material layers of the 30 types of negative electrode raw materials described above. Namely, alumina particles as insulating filler and polyvinylidene fluoride (PVDF) as binder were mixed with N-methylpyrrolidone (NMP) so that the weight ratio of these materials was 97:3 to prepare a composition for forming a protective layer. The composition was then coated over the entire surface of the negative electrode active material layers followed by drying and compressing to produce negative electrode sheets.

Next, cylindrical lithium secondary batteries (battery 110 in FIG. 5) having a diameter of 18 mm and height of 65 mm (18650 type) were produced using the above-mentioned negative electrodes (negative electrode sheets) and the positive electrode (positive electrode sheet) according to the same method as the previously described procedure.

The internal resistance at 25° C. of each of the lithium secondary batteries produced was measured using the same method as previously described. The ratio of the internal resistance value (resistance ratio) of each battery obtained from the measurements was then determined based on a value of 100 for the internal resistance value measured for a lithium secondary battery provided with the negative electrode raw material (namely, lithium secondary battery using a negative electrode not having a protective layer). The results of calculating these resistance ratios are shown in FIG. 7.

Figure 7:
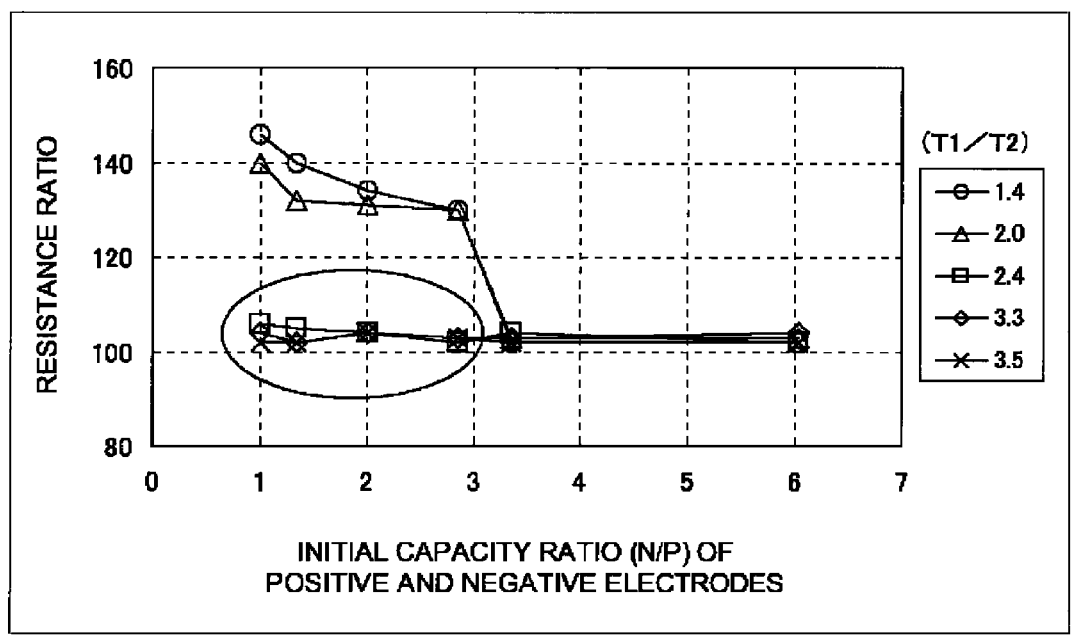

As is clear from the results shown in FIG. 7, those lithium secondary batteries in which a protective layer was formed and the thickness ratio (T1/T2) of the thickness of the negative electrode active material layer after coating (T1) to that after compressing (T2) were 2.4 (Sample Group C), 3.3 (Sample Group D) and 3.5 (Sample Group E) demonstrated a resistance ratio of about 100 and had internal resistance similar to that of a lithium secondary battery using a negative electrode not having a protective layer. Namely, in those batteries in which the ratio (T1/T2) was within the range of 2.4 to 3.5, increases in internal resistance caused by the formation of a protective layer were confirmed to not be observed. On the other hand, in those batteries in which the ratio (T1/T2) was 1.4 (Sample Group A) and 2.0 (Sample Group B), internal resistance exceeded 100 in all cases. Namely, these batteries demonstrated large increases in internal resistance attributable to formation of the protective layer.

Furthermore, since the (T1/T2) ratios were about 100 in those batteries in which the initial capacity ratio (N/P) of the positive and negative electrodes was 3.35 (Sample Group 5) and 6.03 (Sample Group 6), these batteries can be said to be free of impairment caused by formation of the protective layer. However, when considering that internal resistance was high in the battery using a negative electrode not having a protective layer (see FIG. 6), this battery was not as preferable for use as this aspect of battery as the other batteries in which the resistance ratios were 1.00 (Sample Group 1) to 2.85 (Sample Group 4).

On the basis of the above results, lithium secondary batteries provided with a negative electrode in which the ratio (N/P) of the initial capacity (N [mAh/cm$^2$]) of the negative electrode raw material of the lithium secondary battery to initial capacity (P [mAh/cm$^2$]) of the positive electrode is 1.00 to 3.00, and the ratio (T1/T2) of the thickness (T1) of the negative electrode active material layer after coating the above-mentioned composition to the thickness (T2) of the negative electrode active material layer after compressing is set to a prescribed range so as to be greater than 2.0, were confirmed to not demonstrate increases in internal resistance caused by the formation of a protective layer.

Although the above description has provided a detailed explanation of the present invention, the above-mentioned embodiments and examples are merely exemplary, and various variations and modifications of these specific examples are included in the invention disclosed herein. For example, the present invention is not limited to a wound-type battery as described above, but rather can also be applied to lithium secondary batteries of various forms.

INDUSTRIAL APPLICABILITY

According to the present invention, a lithium secondary battery can be provided that is provided with an electrode having a protective layer containing an insulating filler and a binder on the surface of an electrode active material layer, which is resistant to penetration of binder in the protective layer into the electrode active material layer, and in which increases in internal resistance are inhibited.

The invention claimed is:

1. A method for producing a lithium secondary battery comprising a negative electrode having a negative electrode active material layer containing a carbonaceous negative electrode active material and a first binder on a surface of a negative electrode current collector, and a protective layer containing an insulating filler and a second binder on the negative electrode active material layer, the method comprising:
   coating and compressing a composition for forming a negative electrode active material layer containing the carbonaceous negative electrode active material onto the negative electrode current collector, to prepare a negative electrode raw material on which is formed the negative electrode active material layer, and
   configuring the lithium secondary battery so that an initial capacity ratio (N/P) of an initial capacity of the negative electrode raw material (N [mAh/cm$^2$]) to an initial capacity of the positive electrode (P [mAh/cm$^2$]) is 1.0 to 3.0,
wherein
a ratio (T1/T2) of a thickness (T1) of the negative electrode active material layer after coating the composition to a thickness (T2) of the negative electrode active material layer after compressing, is 2.4 to 3.5.

2. The method according to claim 1, wherein
the initial capacity (N) of the negative electrode is measured using a measurement cell constructed by using the negative electrode stamped out to a prescribed size as a measurement electrode and a lithium metal electrode as a counter electrode, and determined by carrying out an initial charge/discharge cycle in which lithium ions are inserted into the negative electrode active material until the potential of the measurement electrode of the measurement cell becomes 0.01 V (vs. Li/Li$^+$), after which lithium ions are released until the potential of the measurement electrode becomes 0.5 V (vs. Li/Li$^+$), and
the initial capacity (P) of the positive electrode is measured using a measurement cell constructed by using the positive electrode stamped out to a prescribed size as a measurement electrode and a lithium metal electrode as a counter electrode, and determined by carrying out an initial charge/discharge cycle in which lithium ions are inserted into the positive electrode active material until the potential of the measurement electrode of the measurement cell becomes 4.3 V (vs. Li/Li$^+$), after which lithium ions are inserted into the positive electrode active material until the potential of the measurement electrode becomes 3.0 V (vs. Li/Li$^+$).

3. The producing method according to claim 1, wherein the initial capacity ratio (N/P) is 1.3 to 2.8.

4. The producing method according to claim 1, wherein alumina particles are used as the insulating filler of the protective layer.

5. The producing method according to claim 1, wherein the second binder of the protective layer differs from the first binder of the negative electrode active material layer.

* * * * *